United States Patent
Tondorf et al.

(10) Patent No.: US 6,995,836 B1
(45) Date of Patent: Feb. 7, 2006

(54) ANGLE MEASURING SYSTEM

(75) Inventors: Sebastian Tondorf, Waging (DE); Jürgen Thiel, Bonn (DE); Jan Braasch, Trostberg (DE); Volker Seyfried, Nussloch (DE); Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 209 days.

(21) Appl. No.: 10/148,111

(22) PCT Filed: Oct. 25, 2000

(86) PCT No.: PCT/EP00/10531

§ 371 (c)(1),
(2), (4) Date: Oct. 28, 2002

(87) PCT Pub. No.: WO01/38828

PCT Pub. Date: May 31, 2001

(30) Foreign Application Priority Data

Nov. 26, 1999   (DE) .................................. 199 56 912

(51) Int. Cl.
*G01B 11/26* (2006.01)

(52) U.S. Cl. ..................................................... 356/138

(58) Field of Classification Search ................... 356/3, 356/138–147; 250/231.13, 231.14, 231.15, 250/231.16, 231.17, 231.18
See application file for complete search history.

(56) References Cited

U.S. PATENT DOCUMENTS

| | | | |
|---|---|---|---|
| 3,612,695 A * | 10/1971 | Bouwhuis et al. .......... 356/364 |
| 4,218,615 A | 8/1980 | Zinn, Jr. | |
| 4,725,146 A | 2/1988 | Hutchin | |
| 4,804,270 A * | 2/1989 | Miller et al. ................. 356/508 |
| 4,849,620 A | 7/1989 | Guerin et al. | |
| 5,120,132 A * | 6/1992 | Spies et al. ................. 356/499 |
| 5,196,900 A | 3/1993 | Pettersen | |
| 5,333,048 A * | 7/1994 | Michel et al. .............. 356/494 |
| 5,355,220 A | 10/1994 | Kobayashi et al. | |
| 5,499,098 A | 3/1996 | Ogawa | |
| 5,502,568 A | 3/1996 | Ogawa et al. | |
| 5,805,287 A | 9/1998 | Pettersen et al. | |
| 5,841,134 A * | 11/1998 | Burgschat et al. ...... 250/237 G |
| 5,900,936 A | 5/1999 | Shirley et al. | |
| 6,297,497 B1 | 10/2001 | Braunecker et al. | |
| 6,437,323 B1 * | 8/2002 | Franz et al. ........... 250/231.13 |
| 6,654,128 B2 * | 11/2003 | Takayama et al. .......... 356/499 |

(Continued)

FOREIGN PATENT DOCUMENTS

DE    39 38 935    5/1991

(Continued)

OTHER PUBLICATIONS

R.M. Pettigrew, "Analysis of Grating Imaging and its Application to Displacement Metrology," SPIE 1st European Congress on Optics Applied to Metrology, vol. 136, 1977, pp. 325-332.

*Primary Examiner*—Michael P. Stafira
(74) *Attorney, Agent, or Firm*—Brinks Hofer Gilson & Lione (57) ABSTRACT

An angle measuring system for the contactless determination of an angle between a first object and a second object which can be moved with respect to each other, the angle measuring system including a first component having a light source and connected to a first object and a second component having a photodetector and connected to a second object. A grating is connected either to the first component or the second component, the grating having a combined amplitude-phase grating.

32 Claims, 5 Drawing Sheets

U.S. PATENT DOCUMENTS

2001/0015808 A1 * 8/2001 Akihiro .................. 356/499

FOREIGN PATENT DOCUMENTS

| DE | 4303162 A1 * | 8/1994 |
|----|---|---|
| DE | 44 10 078 | 9/1994 |
| DE | 196 21 195 | 8/1997 |
| DE | 197 13 336 | 7/1998 |
| DE | 197 38 179 | 5/1999 |
| DE | 199 41 318 | 3/2001 |
| EP | 0 241 374 | 10/1987 |
| EP | 0 331 353 | 9/1989 |
| EP | 1 081 457 | 3/2001 |
| GB | 2 271 633 | 4/1994 |
| GB | 2271633 A * | 4/1994 |

* cited by examiner

ANGLE MEASURING SYSTEM

The present invention relates to an angle measuring system for contactless angular measurements.

DESCRIPTION OF THE RELATED ART

A position measuring system with a so-called mixed amplitude phase grating, called MAP grating for short, is known from European Patent Application 00115881.5 of Applicant, which includes combined amplitude and phase structures alternatingly arranged in the measuring direction. Because of this, the ±1st diffraction order substantially contributes to the output signals of the grating, other diffraction orders are substantially suppressed.

In accordance with U.S. Pat. No. 5,196,900, the entire contents of which are incorporated herein by reference, an angle measuring system is realized by a camera system which employs a lens for representing a point-shaped light source on a two-dimensional photosensitive field. After the axially symmetrical center of the lens of the angle measuring system has been determined, it is possible to determine two angles simultaneously in a contactless manner. An image processing unit is provided for this, which determines two-dimensional angle values for each light source. Furthermore, a processor is provided for calculating the coordinates in space for each light source. Accuracy is improved in that a statistical analysis of the intensity values of the two-dimensional photosensitive field determined by adjacent field elements takes place.

A method and an arrangement for determining the position and location of several objects in relation to each other is known from U.S. Pat. No. 5,805,287, the entire contents of which are incorporated herein by reference. At least two cameras with electro-optical sensors are required for this, and a network of reference points, whose positions are either known, or are determined in that at least one camera determines the projections of the reference points from different positions in space. Thereafter, the camera positions are determined by the known positions of the reference points. Then the positions of the objects in relation to each other are determined in that a testing tool is brought into contact with at least one point of the object and the measured values for the testing tool are determined by at least two cameras in known positions.

It is disadvantageous in connection with U.S. Pat. Nos. 5,196,900 and 5,805,287, the entire contents of each of which is incorporated herein by reference, that the light source is represented only in a single point on the two-dimensional photosensitive field by the lens, and because of this only a few pixels provide location information of the light source. Unavoidable noise leads to uncertainties in the position determination in this case. Besides the insufficient accuracy, the relatively large outlay required for position determination is disadvantageous. At least two cameras are needed for determining a measured value. Moreover, the representation in the cameras is performed by a lens, which leads to large measurement uncertainties. With such systems the ratio between resolution and measuring range lies only within a range of $\geq 10^{-4}$.

An optical incremental angle encoder is known from U.S. Pat. No. 4,218,615, the entire contents of which are incorporated herein by reference, in which a light source illuminates a gap. The light passing through the gap illuminates a first grating, which is fixed in relation to the light source and the gap. An image of this grating is present in the Talbot planes. A second grating, which is displaceable in relation to the first grating in the measuring direction, is arranged in one of the Talbot planes. By the displacement of this second grating in the measuring direction in relation to the first grating, the amplitude of a photodetector arranged behind the second grating is changed as a function of the relative displacement of the second grating in relation to the first grating in the measuring direction.

A method and an arrangement for measuring surface deformations and surface displacements is known from U.S. Pat. No. 5,900,936, the entire contents of which are incorporated herein by reference. For this purpose, two sources of coherent light are arranged at a defined distance, both of which radiate in the direction toward an optodetector. The optodetector is arranged on the surface whose deformation or displacement is to be measured. There, an interference pattern is created with the intensity of the light from the two coherent light sources changing in the measuring direction. The changes in intensity caused by a movement of the optodetector are evaluated in a processor.

SUMMARY AND OBJECTS OF THE INVENTION

It is therefore an object of the present invention to disclose an angle measuring system which makes possible the greatest possible direct angle detection of a first object with respect to a second object. In this regard it is particularly desirable that the distance between the first and second objects, and therefore the distance between individual components of the measuring system, can vary over a wide range.

This object is attained by an angle measuring system for the contactless determination of an angle between a first object and a second object which can be moved with respect to each other, the angle measuring system including a first component having a light source and connected to a first object and a second component having a photodetector and connected to a second object. A grating is connected either to the first component or the second component, the grating having a combined amplitude-phase grating.

This object is also attained by an angle measuring system for the contactless determination of an angle between a first object and a second object which can be moved with respect to each other, the angle measuring system including a first component having a light source and a photodetector and connected to a first object and a second component having a retro-reflecting element and connected to a second object. A grating is connected either to the first component or the second component, the grating having a combined amplitude-phase grating.

The angle measuring system in accordance with the present invention has the advantage that, in case of its employment in the work space of a machine tool, a compensation for thermal expansion and deformations of a machine is not required, because the angle measuring system substantially directly detects the angular change between the two objects, for example the tool and the workpiece. Only the components of a light source, a grating and an optical sensor, are required for this function. Because of this the angle measuring system of the invention can be produced in a compact and cost-effective manner.

As a further advantage it can be said that even a possible tilting of the components of the angle measuring system of the present invention does not erroneously affect the angle measurement.

Further advantages, as well as details of the angle measuring system of the present invention, as well as the method of the present invention, ensue from the following description of the exemplary embodiments by the drawings. Shown therein are in:

DESCRIPTION OF THE PREFERRED EMBODIMENT(S) OF THE INVENTION

First, an overview of the angle measuring system in accordance with the present invention and its functioning in accordance with a first exemplary embodiment will be provided. Subsequently, the individual components will be described in detail by alternative possibilities of their production. Thereafter, an alternative exemplary embodiment will be briefly explained.

Figure 1:
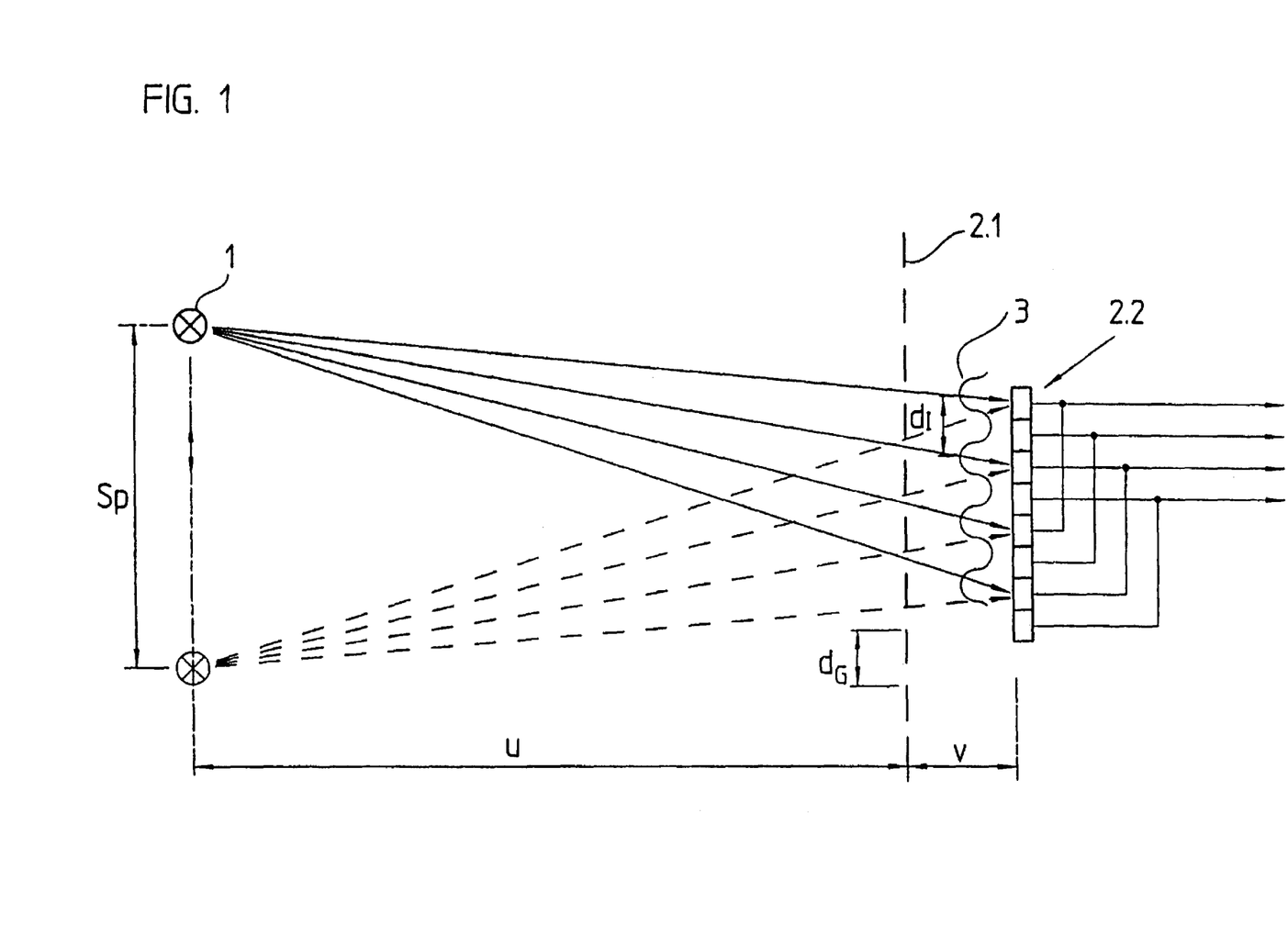
FIG. 1 schematically shows a first possible embodiment of an angle measuring system in accordance with the present invention.

A first possible embodiment of an angle measuring system in accordance with the present invention is represented in FIG. 1. For determining the angle between two objects which can be moved with respect to each other, a light source 1 is fastened to a first movable object. A detector unit 2 is arranged on a second movable or stationary object at a scanning distance u—varying within defined limits—which detects the light from the light source 1. It is of course possible here to interchange the detector unit 2 and the light source 1.

If the angle measuring system in accordance with the present invention is employed with a machine tool, the non-rotating spindle head of the machine tool is selected as the first movable object, wherein the light source 1 is preferably arranged near the chucking device for the tool, and the chucking device for the workpiece is advantageously selected as the second object, wherein the detector unit 2 is preferably arranged near the workpiece. In accordance with the present invention it is particularly advantageous that the closer the light source 1 and the detector 2 are arranged to the contact point between the tool and the workpiece, the more it is possible to take effects into account which falsify the measured result directly in the measurement results. By this it is possible to omit to a large extent a compensation of such effects (in particular thermal expansion and mechanical inaccuracies). This is possible because of the design in accordance with the present invention of the angle measuring system, wherein the light source 1 and the detector unit 2, arranged on different objects, are placed as closely as possible to the point at which the angular change of the first object in relation to the second one is to be determined.

The light source 1 radiates divergently and is preferably realized by a light-emitting diode. The angles of divergence of the light source 1 have been selected to be so large that the detector unit 2 is illuminated with a sufficient intensity within the measuring volume at each one of its own positions or locations, as well as any position or location of the light source 1.

The detector unit 2 includes a grating 2.1 of the grating constant $d_G$, as well as a preferably structured photodetector 2.2, which has a plurality of individual photo elements of similar or identical dimensions, arranged at a distance v from the grating 2.1. Alternatively it is also possible to realize the structured photodetector 2.2 by a single photo element, in front of which a grating is arranged. If it is intended to detect several phase relations of the radiation intensity of the light impinging on the photodetector 2.2, several electrically separated individual photo elements must be employed. These can be offset with respect to each other or, with a structured photodetector 2.2, placed inside each other.

Figure 2:
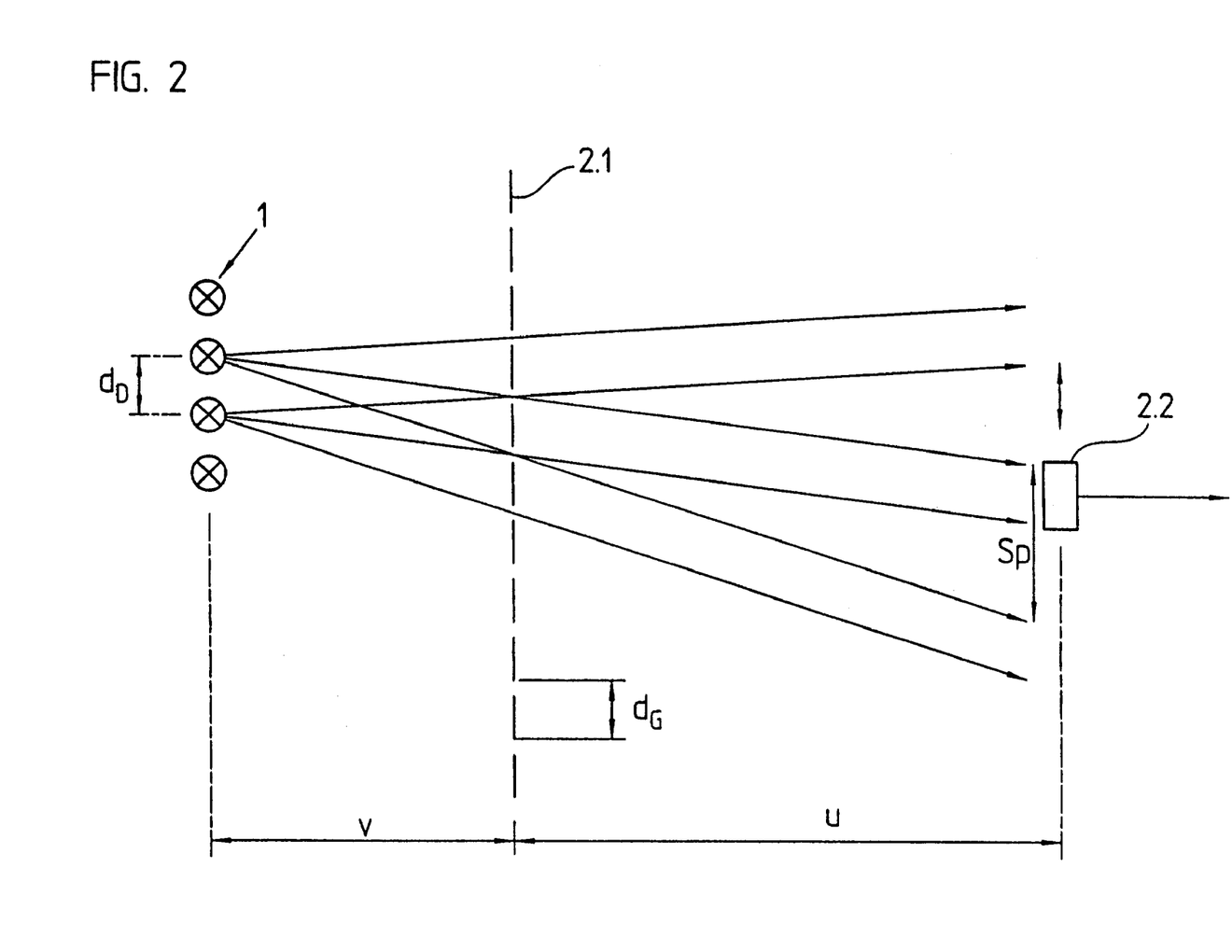
FIG. 2 schematically shows a second possible embodiment of an angle measuring system in accordance with the present invention.

The grating 2.1 illuminated by the light source 1 generates an intensity strip system 3 of a period $d_I$ on the structured photodetector 2.2. The position of the intensity strips is a function of the angular position of the light source 1 in relation to the detector unit 2. If the light source 1 is displaced in relation to the detector unit 2 in the direction toward the grating vector of the grating 2.1, the intensity strip system 3 wanders over the photodetector 2.2. In this case the grating vector stands perpendicularly on a grating line and points in the direction of another grating line. The distance over which the light source 1 must be moved in the direction of the grating vector, so that the intensity strip system 3 is displaced by one period $d_I$ on the photodetector 2.2, is called a virtual signal period $SP_O$ in what follows. The term SP represents the real or actual fringe period of the fringes in the detection plane as shown in FIG. 2.

The use in accordance with the present invention of a grating 2.1 as the imaging element between the light source 1 and the photodetector 2.2 offers the advantage that not merely a single image of the light source 1 is created on the photodetector 2.2, but many, because of which it is possible to considerably increase the resolution.

An advantageous configuration is provided for example by the following dimensions of the angle measuring system in accordance with the present invention:

| | |
|---|---|
| Scanning distance u between the light source 1 and the detector unit 2 | 0.5 to 1.5 m |
| Distance v between the grating 2.1 to the structured photodetector 2.2 | 80 mm |
| Grating constant $d_G$ of the grating 2.1 (for the geometric image, or the diffracted image) | 148 µm/296 µm |
| Detector period $d_D$ | 160 µm |
| Diameter of the light source 1 | 400 µm |
| Virtual signal period $SP_o$ at the scanning distance $u_o$ = 1 m | 2 mm |
| Intensity period at the structured photodetector 2.2 (as a function of the scanning distance u) | 156 µm to 171 µm |
| Number of detector periods $d_D$ | 5 |
| Number of individual photo elements | 20 |
| Phase angle between the individual photo elements | 90° |

A multitude of variation options are available for designing the angle measuring system in accordance with the present invention, which can be combined with each other as desired. Some will be explained in what follows.

The light source 1 in accordance with the present invention will be explained in detail in what follows.

The light source 1 is designed in such a way that, if possible, in connection with every possible position of the light source 1 in relation to the detector 2, the center of the emission of the light beams is located at the same place. This is achieved, for example, by a light source 1 which is, at least in sections, flat, cylinder-shaped or spherical. Advantageously, the extension of the light source 1 should approximately be less than the virtual signal period SP.

Moreover, the emission point of the light source 1 can be displaced by a lens in such a way that a virtual emission point is created. Because of this a measurement can be performed as closely as possible to the desired location, for example the spindle. Furthermore, the divergence can also be altered by an appropriate lens.

There is also the possibility of not using the location of the generation of the light radiation directly as the light source, but instead to conduct the light radiation via optical wave guides to one or several locations which are advantageous for the light source 1, in particular close to the workpiece or close to the tool. In that case the end of the optical wave guide at which the light exits divergently is defined as the light source 1. By that the advantage exists of having a small, round radiating surface with a central emission point which is independent of the angle. This is also particularly suitable for small measuring volumes, where a light source 1 of sufficient radiation intensity would need a not inconsiderable amount of space. In that case the light source could be arranged remote from the measuring volume, and several optical wave guides can conduct the radiation from a single light source 1 to different locations which are advantageous for the angle measuring system.

Any light source which has a small luminous surface, is basically suitable as a light source 1. The maximum extension of the light source 1 should not exceed 75% of the minimally occurring virtual signal period $SP_0$, because otherwise the modulation is too small. In case rotations between the light source 1 and the detector unit 2 occur, a round luminous surface is advantageously selected for the light source 1. Particularly suitable light sources 1 are light-emitting diodes, semiconductor laser diodes, including vertically emitting VCSELs, arc lamps and other discharge lamps, and incandescent lamps. To make the adherence to protective laser regulations easier, light sources in the visible wave length range, or also in the so-called "eye safe" range, can be advantageous.

The selection of the grating 2.1 is of decisive importance for the angle measuring system. Sine gratings or MAP gratings are preferably used; in connection with such gratings, a supplementary specific reference is made to the already mentioned European Patent Application No. 00115881.5. In this case, a sine grating is understood to be a combined amplitude-phase grating having a $sin^2$-shaped intensity pattern with phase shifts around 180° in the zero points of the intensity. By such gratings 2.1 it is possible to assure that no zero points of the modulation, nor phase shifts in the intensity strip system on the photodetector 2.2 can occur. Therefore, the intensity of the light from the light source 1 only decreases as a function of the distance u+v from the light source 1, or its tilting in relation to the detector. When using a suitable MAP grating as the grating 2.1, the light intensity of the intensity strip system 3 substantially has the same pattern as with the sine grating. The $sin^2$-shaped pattern can be well approximated with a suitable MAP grating, since the MAP grating is more cost-effective to produce than a sine grating.

The incremental angle measuring system in accordance with the present invention can also have reference markers. So-called chirped reference markers are advantageous, which are preferably employed in the diffraction image or in the geometric shadow area, and include a suitable strip arrangement on the grating 2.1 and a suitable arrangement of individual photo elements in a structured photodetector 2.2. It is also possible to use a scanning grating alternatively to a plurality of photo elements, to which a single photo element is applied. A strip-gap combination of the grating 2.1 is preferably selected, wherein the grating constant is smallest at the reference point and increases outward on both sides. This takes into consideration that the virtual grating constant $SP_O$ can change with a varying scanning distance u between the detector 2 and the light source 1.

The detection of the location of the intensity strip system 3 takes place by the structured photodetector 2.2. Such a structured photodetector 2.2 can be realized—as already described—in two different ways. A grating with transparent and opaque areas can be arranged in front of a single photo element. Alternatively, several, electrically separated photo elements can be provided, which have a defined width and a defined distance from each other, by which a grating structure is also realized. Here, the photodetector 2.2 preferably includes a sequence of several individual photo elements in the measuring direction, which are preferably provided on a single substrate. The electrical separation between the individual photo elements can be provided by a diffused-in barrier. To increase the sensitivity of the photodetector 2.2, the individual photo elements are conductively connected with each other at a distance $d_D$. In this case the distance $d_D$ is selected to be such that this distance between the connected individual photo elements—here called the detector period $d_D$—agrees with the period $d_I$ of the intensity strip system 3 for a defined distance between the light source 1 and the photodetector 2.2. Because of this measure, phase-shifted scanning signals are generated at the individual outlet lines of the structured photodetector 2.2 when the light source 1 moves. The phase offset is calculated from the quotient of 360° by the number of individual photo elements per period $d_I$ of the intensity strip system 3.

Alternatively to this, another way of proceeding is also conceivable when using CCD lines as photodetectors. Here, the readout of the CCD elements does not take place very rapidly in comparison with the respective measurement time, such as is often the case. Instead, the charges in the CCD elements are forwarded by a bucket chain circuit extending perpendicular with respect to the intensity strips in the detector plane at an even speed, so that the "active surface", respectively defined by the location of the conveyed charge, lingers at all locations of the intensity strip system 3 for the same length of time. With a chronologically constant illumination this would result in a constant, i.e. unmodulated, current at the signal output of the CCD elements. But since now the intensity of the light source 1 is modulated, for example sinusoidally with a suitable frequency, a modulated signal also appears at the signal output of the CCD elements, from whose phase relation with the input signal of the light source 1 the angle of the light source 1 in relation to the detector unit 2 can be determined.

An advantage of the described technique rests above all in that chronologically constant differences, such as different scattered light coverages, reception sensitivity, openings, etc. of the individual light-sensitive elements are being partially or completely neutralized by the movement of the respective "active detector surface", and correspondingly do not result in an angle measurement error. Erroneous inputs from the electronic evaluation device are also minimized, since all signals pass through the same electronic device. Moreover, signal offsets can be easily eliminated by high-pass filtering.

For being able to employ this technique in connection with all distances u between the light source 1 and the detector unit 2, it may be necessary to match the modulation frequency of the light source 1, or the readout clock rate of the CCD line to the respective instantaneous distance u between the light source 1 and the detector 2 in the form of the CCD line. In this connection arrays of photo elements, advantageously produced by CMOS technology, with down-stream-connected multiplexers, represent a realization equivalent to the CCD lines. Here, the selection of an output signal of a photo element is made in accordance with the readout clock rate of the CCD line.

Figure 3:
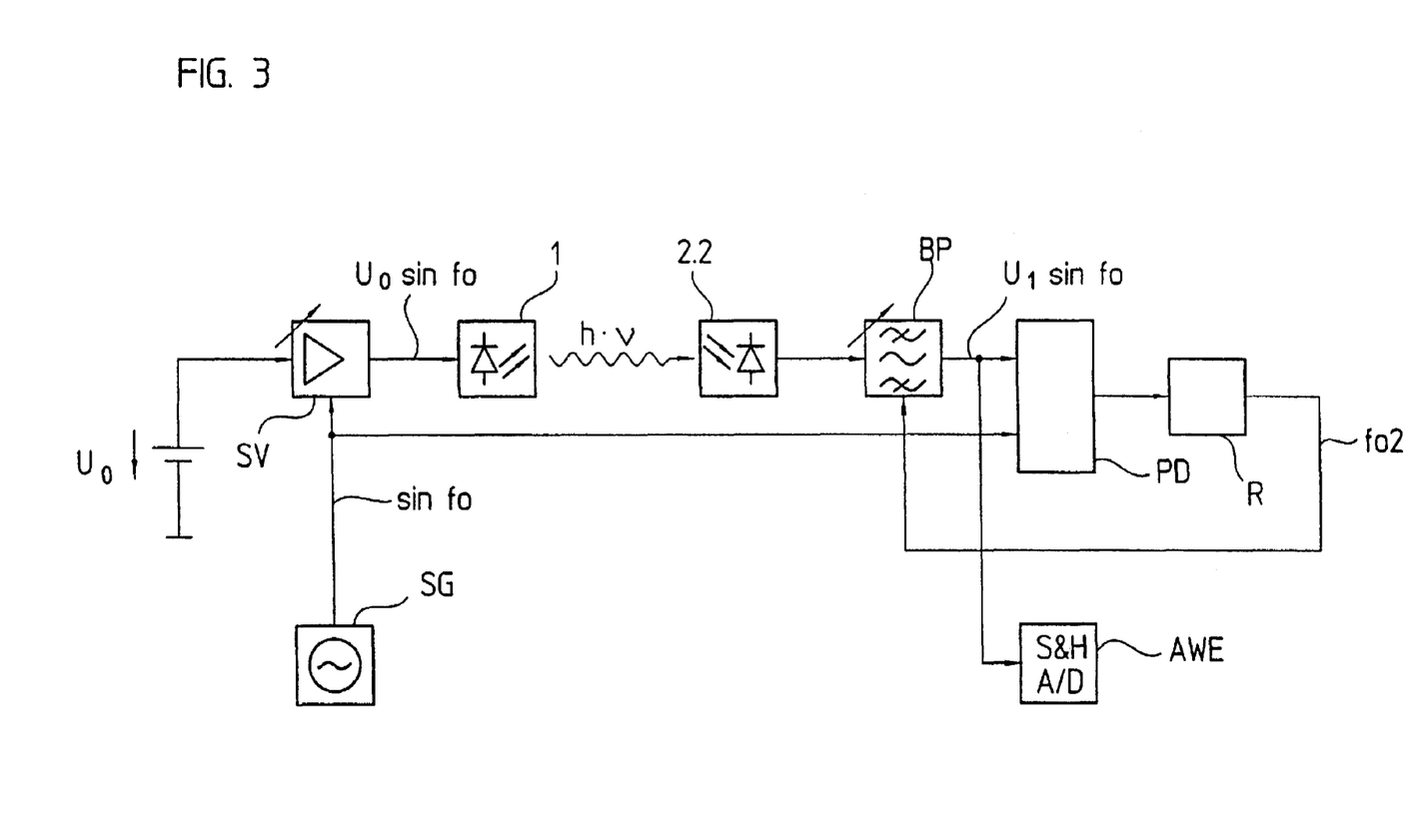
FIG. 3 schematically shows a first possibility in accordance with the present invention of producing an electronic evaluating device.
Figure 4:
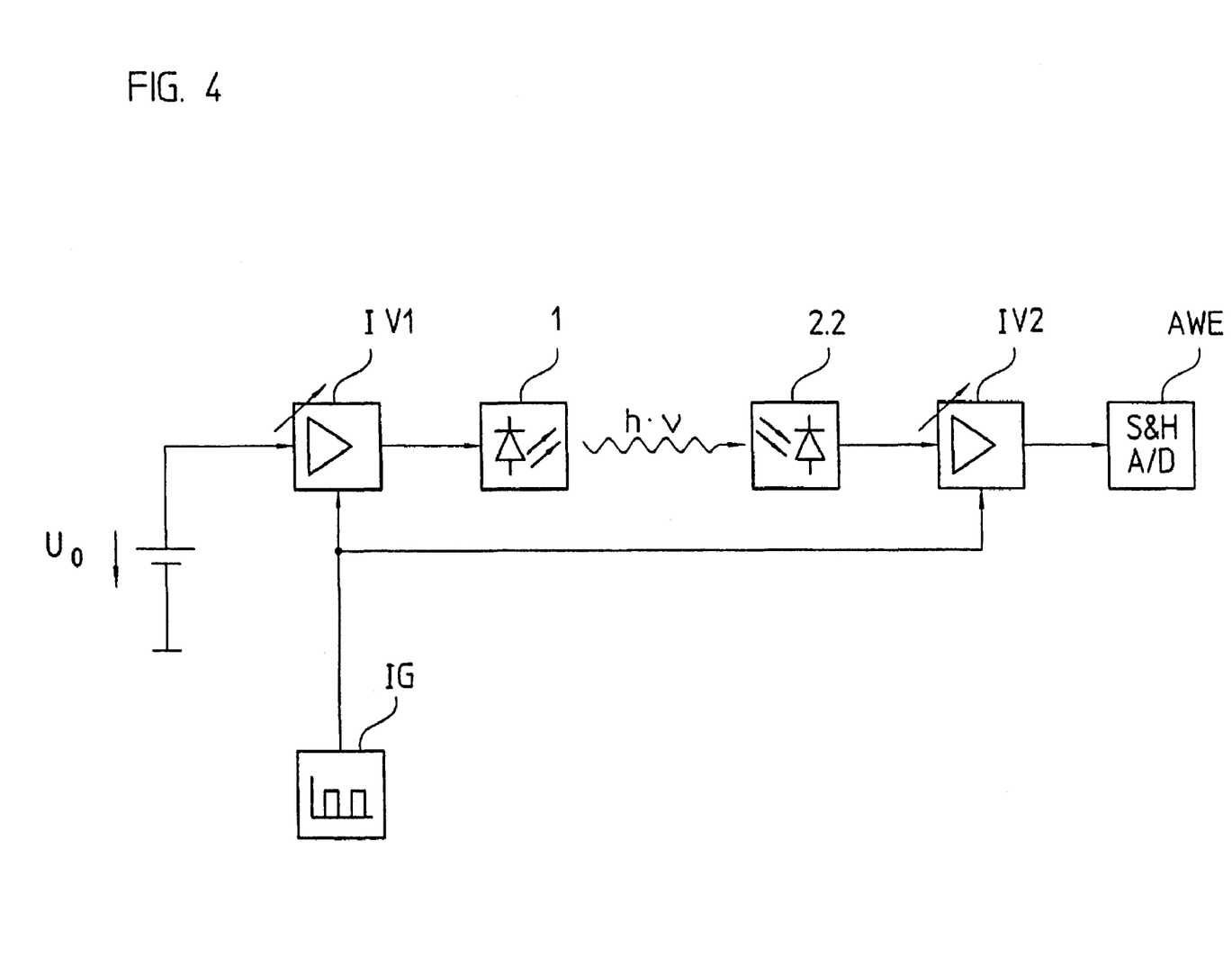
FIG. 4 schematically shows a second possibility in accordance with the present invention of producing an electronic evaluating device.
Figure 5:
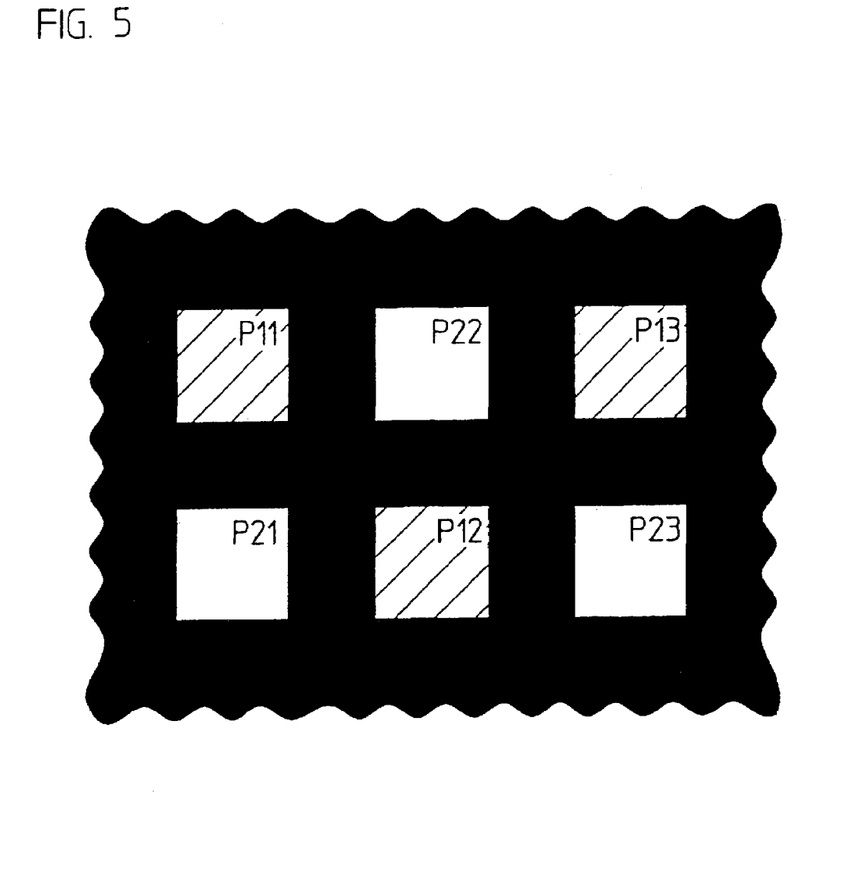
FIG. 5 schematically shows an exemplary embodiment of a two-dimensional mixed amplitude-phase grating to be used with the angle measuring systems of FIGS. 1–2.
Figure 6:
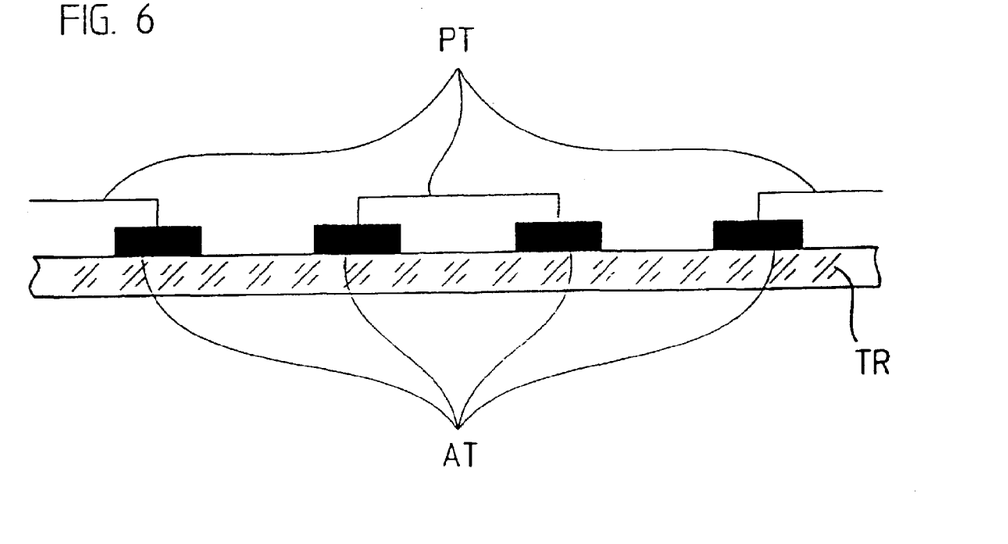
FIG. 6 schematically shows an exemplary embodiment of a one-dimensional mixed amplitude-phase grating to be used with the angle measuring systems of FIGS. 1–2.

It is possible by the following electronic evaluation device to regulate the amplification factor at which the radiation output of the light source 1 is set in such a way that the intensity fluctuations of the intensity strip system 3 based on the changing distance between the light source 1 and the photodetector 2.2, or on a rotation, or tilting, of the light source 1 with respect to the photodetector 2.2 can at least be substantially compensated. The electronic evaluation device furthermore amplifies the output signals of the structured photodetector 2.2. This amplification is preferably performed directly following detection by a particularly low-noise amplifier, because the amplitude of the output signal of the individual photo elements can be very small, and transmission over additional lines could cause interference. Subsequently an analog/digital conversion of the scanning signals takes place, after, or during which amplification can again take place. Thereafter a conversion of the digital scanning signals of the intensity strip system 3 into position values by the arc tan function takes place, which can be performed by an arc tan computer or by a stored value table. The position values indicate the angular position of the light source 1 in relation to the detector unit 2, and therefore the location of the tool in relation to the workpiece.

Interfering background light can be reduced or suppressed by wavelength filters. Further than that it is possible to employ modulation techniques with which the radiation output of the light source 1 is periodically modulated, and the electronic detection device detects this modulation by suitable filters, for example band pass filters. In the course of this, because of a displacement of the light source 1 and the detector 2 in relation to each other, it is necessary as a rule to select the modulation frequency to be considerably higher than the maximum signal frequency. Moreover, a quasi single field scan when using a structured photodetector 2.2 results in that, with a suitable evaluation, for example with four phase relations displaced by 90°, a locally homogeneous scattered light distribution does not, or only insignificantly, change the result of the measurement.

On the one hand, the longest possible measurement time for averaging over the unavoidable signal noise is desirable for each angular measurement. On the other hand, with high displacement speeds the dynamic error, which then increases, limits the length of measurement. It is therefore advantageously possible in connection with the described angle measuring system to employ an electronic evaluation device with reversible or variable electronic analog band width. By changing the analog band width, a high degree of accuracy at low displacement speeds is achieved because of a long averaging time while, although a higher noise error because of short measuring times is created with high displacement speeds, the dynamic error, which is dominant here, can be kept low. It is of course correspondingly also possible to employ two or more electronic evaluation devices of different fixed analog band width for the same purpose. When using several electronic evaluation devices it is possible to provide each individual one with its own structured photo elements.

In the course of a multiple use of detectors 2, a chronological separation of the contributions from different light sources 1 can be meaningful. This can be realized in that the light sources 1 of different angle measuring systems are operated in different time slots of a time-division multiplex, and that the time-division multiplex layout of the light sources 1 is known in the electronic evaluation device of the common detector 2. In connection with the light sources there is the further possibility that their intensity is modulated with different carrier frequencies, so that the signal portions of individual light sources can be assigned by appropriate demodulators or band pass filter in the evaluation unit of the detector 2.

FIG. 2 shows a second alternative exemplary embodiment of the angle measuring system of the present invention. This substantially differs from the first exemplary embodiment in that in comparison with the latter the light source 1 and the photodetector 2.2 have been interchanged. A photodetector 2.2 located on the movable object now detects the light radiated into space by a light source unit 1. Analogous to the detection unit 2 in the first exemplary embodiment, the light source unit 1 here includes a plurality of individual light sources, some of which can be separately controlled, and a grating 2.1 with the grating constant $d_G$.

For example, the light source unit 1 can contain four equidistantly arranged laser diodes or light-emitting diodes, whose intensity strip systems 3 are displaced in space with respect to each other by a phase of exactly 90°. If individual light-emitting diodes are triggered directly one after the other, and the light output impinging on the light detector 2.2 is measured, it is again possible to detect the angular position of the photo element 2.2 in relation to the light source 1 from the amplified and analog/digitally converted scanning signals by an arc tan computer or an appropriate table for conversion.

With this second exemplary embodiment of the angle measuring system in accordance with the present invention it is not absolutely required that the individual light sources are actually operated in chronological sequence, or that the signals from the individual light sources are detected in chronological sequence. Instead, the intensity strip patterns 3 emitted by them, or detected by the photo element 2.2, can also chronologically overlap. In this case the intensities of the different individual light sources would be chronologically modulated, for example in a sine shape, wherein triggering of each of the individual light sources takes place phase-shifted over time. This has the result that the signal detected by the photo element 2.2 is also modulated in time, wherein the phase shift in relation to the triggering the individual light sources is again a measure of the angle of the photo element 2.2 in relation to the light source 1.

If in certain employment situations no rotation of the detector 2 around the connecting axis of the light source 1 can occur, the photo element 2.2 does not have to have the otherwise large degree of symmetry otherwise required. In that case the photodetector 2 can again be composed of individual elements, each one of which is laid out (for example by color filters, etc.) to detect the light from a defined individual light source. In this case it is then of course not necessary that the measurement of the radiation intensity reaching the photodetector 2 takes place in chronological sequence, instead, it can take place simultaneously, which has the advantage that the individual light sources can be continuously operated.

In a further embodiment of the present invention the light source 1 and the detector 2 are arranged directly adjoining each other on a first object. A retro-reflecting element is arranged on the second object whose relative angular change is to be measured, which reflects the light radiation, slightly offset, in the direction of the light source. A triple mirror, a triple prism, a retro-reflector, a ridge prism, or a lens combined with a mirror arranged in the focal plane, can be used as the retro-reflecting element. This has the advantage that only the components light source 1 and detector 2, arranged on an object, require electrical connecting lines, but the retro-reflecting element does not required them.

We claim:

1. An angle measuring system for the contactless determination of an angle between a first object and a second object which can be moved with respect to each other, comprising:
   a first component comprising a light source and connected to a first object;
   a second component comprising a photodetector and connected to a second object;
   a grating connected either to said first component or said second component, said grating comprises a combined amplitude-phase grating, wherein said grating has a $\sin^2$-shaped pattern of transmission intensity, and phase shifts of 180° are present in zero points of said pattern of transmission intensity.

2. The angle measuring system in accordance with claim 1, wherein said grating comprises a transparent carrier material on which opaque layers of an amplitude graduation, as well as transparent layers of a phase graduation, are arranged.

3. The angle measuring system in accordance with claim 2, wherein said opaque layers define a series of spaces lying therebetween, and wherein each of said transparent layers are arranged in separate ones of said spaces and no two of said transparent layers are arranged in consecutive ones of said series of spaces so as to cause a phase shift of 180° of light passing through.

4. The angle measuring system in accordance with claim 2, wherein phase strips of said phase graduation are arranged on a side of said grating between opaque strips of said amplitude graduation, which cause a phase shift of 180° of light passing through.

5. The angle measuring system in accordance with claim 1, wherein said grating comprises a two-dimensional amplitude graduation, only defined places of which are transparent, wherein a phase graduation is alternatingly arranged respectively horizontally and vertically at said transparent places, which causes a phase deviation of 0° or 180°.

6. The angle measuring system in accordance with claim 1, wherein said photodetector is a structured photodetector, which includes a plurality of individual photo elements, which are arranged parallel with respect to an intensity strip pattern generated by said light source and said grating.

7. An angle measuring system for the contactless determination of an angle between a first object and a second object which can be moved with respect to each other, comprising:
   a first component comprising a light source and connected to a first object;
   a second component comprising a photodetector and connected to a second object;
   a grating connected either to said first component or said second component, said grating comprises a combined amplitude-phase grating;
   wherein said photodetector is a structured photodetector, which includes a plurality of individual photo elements, which are arranged parallel with respect to an intensity strip pattern generated by said light source and said grating.

8. The angle measuring system in accordance with claim 7, wherein said grating is assigned to said second component, and said grating is arranged at a fixed spatial relationship with said photodetector, and a distance between said light source and said grating is considerably greater than a distance between said grating and said photodetector.

9. The angle measuring system in accordance with claim 7, further comprising a controllable amplifier, which regulates power conducted to said light source as a function of an output detected in said photodetector.

10. The angle measuring system in accordance with claim 7, wherein said light source is structured so that for every possible location of said light source in relation to said photodetector an emission center of light beams emitted by said light source lies at the same location.

11. The angle measuring system in accordance with claim 10, wherein said light source is spherical.

12. The angle measuring system in accordance with claim 10, wherein said light source is flat, at least in sections.

13. The angle measuring system in accordance with claim 7, wherein said grating comprises a transparent carrier material on which opaque layers of an amplitude graduation, as well as transparent layers of a phase graduation, are arranged.

14. The angle measuring system in accordance with claim 13, wherein said opaque layers define a series of spaces lying therebetween, and wherein each of said transparent layers are arranged in separate ones of said spaces and no two of said transparent layers are arranged in consecutive ones of said series of spaces so as to cause a phase shift of 180° of light passing through.

15. The angle measuring system in accordance with claim 13, wherein phase strips of said phase graduation are arranged on a side of said grating between opaque strips of said amplitude graduation, which cause a phase shift of 180° of light passing through.

16. An angle measuring system for the contactless determination of an angle between a first object and a second object which can be moved with respect to each other, comprising;
   a first component comprising a light source and connected to a first object;
   a second component comprising a photodetector and connected to a second object;
   a grating connected either to said first component or said second component, said grating comprises a combined amplitude-phase grating;
   wherein said photodetector is a structured photodetector, which includes a plurality of individual photo elements, which are arranged parallel with respect to an intensity strip pattern generated by said light source and said grating; and
   wherein, for a defined distance between said light source and said photodetector, at least an averaged period of said intensity strip pattern is a whole-number multiple of a period of structuring of said structured photodetector.

17. An angle measuring system for the contactless determination of an angle between a first object and a second object which can be moved with respect to each other, comprising:
- a first component comprising a light source and a photodetector and connected to a first object;
- a second component comprising a retro-reflecting element and connected to a second object;
- a grating connected either to said first component or said second component, said grating comprises a combined amplitude-phase grating, wherein said grating has a $\sin^2$-shaped pattern of transmission intensity, and phase shifts of 180° are present in zero points of said pattern of transmission intensity.

18. The angle measuring system in accordance with claim 17, wherein said grating comprises a transparent carrier material on which opaque layers of an amplitude graduation, as well as transparent layers of a phase graduation, are arranged.

19. The angle measuring system in accordance with claim 18, wherein said opaque layers define a series of spaces lying therebetween, and wherein each of said transparent layers are arranged in separate ones of said spaces and no two of said transparent layers are arranged in consecutive ones of said series of spaces so as to cause a phase shift of 180° of light passing through.

20. The angle measuring system in accordance with claim 18, wherein phase strips of said phase graduation are arranged on a side of said grating between opaque strips of said amplitude graduation, which cause a phase shift of 180° of light passing through.

21. The angle measuring system in accordance with claim 17, wherein said grating comprises a two-dimensional amplitude graduation, only defined places of which are transparent, wherein a phase graduation is alternatingly arranged respectively horizontally and vertically at said transparent places, which causes a phase deviation of 0° or 180°.

22. The angle measuring system in accordance with claim 17, wherein said photodetector is a structured photodetector, which includes a plurality of individual photo elements, which are arranged parallel with respect to an intensity strip pattern generated by said light source and said grating.

23. An angle measuring system for the contactless determination of an angle between a first object and a second object which can be moved with respect to each other, comprising:
- a first component comprising a light source and a photodetector and connected to a first object;
- a second component comprising a retro-reflecting element and connected to a second object;
- a grating connected either to said first component or said second component, said grating comprises a combined amplitude-phase grating;
- wherein said photodetector is a structured photodetector, which includes a plurality of individual photo elements, which are arranged parallel with respect to an intensity strip pattern generated by said light source and said grating.

24. The angle measuring system in accordance with claim 23, further comprising a controllable amplifier, which regulates power conducted to said light source as a function of an output detected in said photodetector.

25. The angle measuring system in accordance with claim 23, wherein said light source is structured so that for every possible location of said light source in relation to said photodetector an emission center of light beams emitted by said light source lies at the same location.

26. The angle measuring system in accordance with claim 25, wherein said light source is spherical.

27. The angle measuring system in accordance with claim 25, wherein said light source is flat, at least in sections.

28. The angle measuring system in accordance with claim 23, wherein said grating is assigned to said second component, and said grating is arranged at a fixed spatial relationship with said photodetector, and a distance between said light source and said grating is considerably greater than a distance between said grating and said photodetector.

29. The angle measuring system in accordance with claim 23, wherein said grating comprises a transparent carrier material on which opaque layers of an amplitude graduation, as well as transparent layers of a phase graduation, are arranged.

30. The angle measuring system in accordance with claim 29, wherein said opaque layers define a series of spaces lying therebetween, and wherein each of said transparent layers are arranged in separate ones of said spaces and no two of said transparent layers are arranged in consecutive ones of said series of spaces so as to cause a phase shift of 180° of light passing through.

31. The angle measuring system in accordance with claim 29, wherein phase strips of said phase graduation are arranged on a side of said grating between opaque strips of said amplitude graduation, which cause a phase shift of 180° of light passing through.

32. An angle measuring system for the contactless determination of an angle between a first object and a second object which can be moved with respect to each other, comprising:
- a first component comprising a light source and a photodetector and connected to a first object;
- a second component comprising a retro-reflecting element and connected to a second object;
- a grating connected either to said first component or said second component, said grating comprises a combined amplitude-phase grating;
- wherein said photodetector is a structured photodetector, which includes a plurality of individual photo elements, which are arranged parallel with respect to an intensity strip pattern generated by said light source and said grating; and
- wherein, for a defined distance between said light source and said photodetector, at least an averaged period of said intensity strip pattern is a whole-number multiple of a period of structuring of said structured photodetector.

* * * * *